US007551890B2

(12) United States Patent
Fenk et al.

(10) Patent No.: US 7,551,890 B2
(45) Date of Patent: Jun. 23, 2009

(54) METHOD FOR REDUCING THE RADIATION LOAD BY A MOBILE RADIO TERMINAL WITH DIRECTIONAL EMISSION, AND A MOBILE RADIO TERMINAL WITH DIRECTIONAL EMISSION

(75) Inventors: Josef Fenk, Ottenburg (DE); Rainer Kronberger, Höhenkirchen (DE)

(73) Assignee: Infineon Technologies AG (DE)

( * ) Notice: Subject to any disclaimer, the term of this patent is extended or adjusted under 35 U.S.C. 154(b) by 537 days.

(21) Appl. No.: 10/875,442

(22) Filed: Jun. 24, 2004

(65) Prior Publication Data

US 2004/0266343 A1 Dec. 30, 2004

(30) Foreign Application Priority Data

Jun. 25, 2003 (DE) ................................ 103 28 570

(51) Int. Cl.
*H04B 7/185* (2006.01)

(52) U.S. Cl. ..................................................... 455/12.1

(58) Field of Classification Search ................. 455/12.1
See application file for complete search history.

(56) References Cited

U.S. PATENT DOCUMENTS

| | | | | |
|---|---|---|---|---|
| 5,959,984 | A * | 9/1999 | Dent | 370/347 |
| 6,034,634 | A * | 3/2000 | Karlsson et al. | 342/359 |
| 6,157,817 | A * | 12/2000 | Norin et al. | 455/67.11 |
| 6,324,405 | B1 * | 11/2001 | Young et al. | 455/456.1 |
| 6,377,211 | B1 | 4/2002 | Hsiung | 342/359 |
| 6,484,015 | B1 | 11/2002 | Aleiner et al. | 455/90 |
| 6,489,465 | B2 | 12/2002 | Matulic-Adamic et al. | 536/24.5 |
| 6,512,481 | B1 | 1/2003 | Velazquez et al. | 342/367 |
| 2001/0029173 | A1 | 10/2001 | Ogino | 455/279.1 |
| 2004/0259497 | A1 * | 12/2004 | Dent | 455/13.3 |
| 2004/0266343 | A1 * | 12/2004 | Fenk et al. | 455/12.1 |

FOREIGN PATENT DOCUMENTS

| | | | |
|---|---|---|---|
| DE | 101 23 107 | A1 | 11/2002 |
| EP | 1 051 049 | A3 | 4/2000 |
| JP | 11251945 | | 9/1999 |
| JP | 2002353832 | | 6/2002 |
| WO | WO 98/29968 | | 7/1998 |
| WO | WO 98/42150 | | 9/1998 |
| WO | WO 99/52177 | | 10/1999 |

* cited by examiner

*Primary Examiner*—Matthew D Anderson
*Assistant Examiner*—Bobbak Safaipour
(74) *Attorney, Agent, or Firm*—Dickstein, Shapiro, LLP.

(57) ABSTRACT

In a method for alignment of an antenna (1) with an adjustable directional characteristic in a mobile station in a mobile radio system, the alignment process is based on determination of two variables as a function of the direction, with the first variable being characteristic of the signal strength (6) and the second variable being characteristic of the signal quality (5, 15), and their evaluation (7). Furthermore, it is possible to make use of position information and alignment information relating inter alia to satellite-based navigation systems, and to take account of the alignment of the user.

15 Claims, 2 Drawing Sheets

METHOD FOR REDUCING THE RADIATION LOAD BY A MOBILE RADIO TERMINAL WITH DIRECTIONAL EMISSION, AND A MOBILE RADIO TERMINAL WITH DIRECTIONAL EMISSION

PRIORITY

This application claims priority to German application no. 103 28 570.9 filed Jun. 25, 2003.

TECHNICAL FIELD OF THE INVENTION

The present invention relates to a method and an arrangement for alignment of an antenna with an adjustable directional characteristic in a mobile station in a mobile radio system.

BACKGROUND OF THE INVENTION

Depending on the required selected power class, mobile telephones emit transmission power levels of up to 2 W via the transmitting antenna. Particularly in the edge of the supply area of a radio cell or when transmission is interfered with by multipath propagation, the network system administration for the mobile telephone will often choose the highest power class in order to set up and maintain the connection.

If the antenna is in the form of a (shortened) monopole which is fitted externally on the telephone and if there is no interference in the environment in the immediate near field of the antenna, omnidirectional emission is achieved from the mobile telephone, that is to say emission in all directions. Since mobile telephones are normally used against the ear and against the head when setting up and maintaining communication connections, this equally results in undesirable radio-frequency irradiation of the head together with the organs located in it, for example the brain and the eyes. In this case, the assessment principle for the irradiation is the conversion of the radio-frequency energy from the electromagnetic field into body heat, which is indicated in the so-called specific absorption rate (SAR). Depending on the intensity of the irradiation, this leads to a local temperature increase in the head, associated with possible damage to the tissue (microwave effect). Furthermore, so-called non-thermal effects are also currently being discussed, whose possible effects on human health it has not, however, yet been finally possible to verify scientifically.

The majority of the previous methods for reducing the radiation load have been based on a specific configuration of the antenna and its surrounding area so as to jointly optimize the antenna structure and the mounting board with respect to reducing the radiation passing through the user. An integrated planar antenna element is normally used for this purpose, which is fitted on the rear earth side of the mounting board and thus, due to the screening effect of the board, preferably emits away from the head. If the antenna and the board are carefully designed and optimized jointly, together with the other parts of a mobile telephone such as the housing shell, the display and the keypad, it is possible to reduce the power emitted in the direction of the head. In this case, the main lobe direction remains permanently set.

The greatest problem with this method is often the immediate area surrounding the antenna: for example, the earthing configuration, which is normally too small and is thus poor for the frequency band, which is in the Gigahertz range, in the form of the mounting board in the mobile appliance results in major interaction between the antenna and the area surrounding the antenna or the mobile appliance. This interaction means that any change in the area surrounding the mobile appliance, which also includes the way in which the mobile appliance is fixed, in some circumstances may even lead to an increase in the radiation load, since the entire telephone then acts as an antenna and can contribute to emission in any direction, that is to say in particular it can even lead to increased emission in the direction of the user. The omnidirectional radiation characteristic of a mobile appliance normally changes considerably as soon as it is placed against the ear. The process of optimizing the antenna structure in conjunction with the configuration of the mobile appliance is thus carried out only for a single static case, in general with the mobile appliance being held in the ideal manner.

Patent Specification U.S. Pat. No. 6,484,015 B1 discloses an apparatus which envisages the use of a directional antenna with a main lobe direction parallel to the ground or two or more physically separate directional antennas with different main lobe directions parallel to the ground in a mobile radio. In the case of a directional antenna facing away from the user, the purpose of this antenna apparatus is to improve the efficiency as the ratio between the used power and the emitted power, and to reduce the radiation load for the user of the mobile station. The document relates to static directional antennas, whose directional characteristics are not variable.

The Patent Specification U.S. Pat. No. 6,489,465 B1 describes a method in which the user of a mobile telephone is requested to change his position if the antenna is poorly positioned. The mobile telephone antenna does not have a directional characteristic.

German Laid-Open Specification DE 101 23 107 A1 describes a mobile telephone which uses a directional antenna whose main lobe direction can be aligned in the direction of the fixed station by measuring the received power. The total radiation power can be reduced by the directional emission. However, in this method, interference influences can adversely affect the optimum antenna alignment as a result of the directional power measurement for location of the fixed station.

SUMMARY OF THE INVENTION

The invention is based on the object of specifying a method by means of which the power emission from a mobile station in a mobile radio system can be reduced further while maintaining the required transmission quality. In particular, the method is intended to be robust with respect to interference. A further aim of the invention is to provide a corresponding arrangement having the above characteristics.

The object on which the invention is based can be achieved by a method for alignment of an antenna with an adjustable directional characteristic in a mobile station in a mobile radio system, comprising the following steps:

a) determining a first variable which is characteristic of the signal strength, and a second variable which is characteristic of the signal quality, for different alignments of the main lobe direction of the antenna;

b) evaluating the first and second variables as determined in step a) for different alignments of the main lobe direction of the antenna; and c) setting of the main lobe direction of the antenna as a function of an evaluation result determined in step b).

The second variable can be the bit error rate. The main lobe direction of the antenna can be determined by maximizing the second variable for alignments which have been determined by assessment of the first variable. The method may comprise the following steps:

d) determining the following position and alignment information:

the position information for the mobile station, the position information for a fixed station, the geographical alignment of the mobile station; and e) evaluating the position and alignment information determined in step d).

The method may also comprise the step of emission of an in particular acoustic direction changing signal for the user as a function of the evaluation result determined in step e), or as a function of the evaluation result determined in step b). The further evaluation result obtained in step e) can be taken into account in the setting of the main lobe direction in step c). The further evaluation result obtained in step e) can be taken into account in the setting of the main lobe direction in step c). The method may comprise the following steps:

presetting of a provisional main lobe direction of the antenna on the basis of the further evaluation result determined in step e), and then setting of the main lobe direction on the basis of the evaluation result obtained in steps a), b) and c).

The method can be carried out in the standby receiving mode of the mobile station or while a connection is set up between the mobile station and the fixed station. The method may comprise the step of reduction of the emission power after the setting of the main lobe direction of the antenna.

The object can also be achieved by a method for alignment of an antenna with an adjustable directional characteristic in a mobile station in a mobile radio system, comprising the following steps:

determining the following position and alignment information:

the position information for the mobile station, the position information for a fixed station, the geographical alignment of the mobile station;

evaluating the position and alignment information determined in the preceding step; and setting of the main lobe direction of the antenna as a function of the evaluation result determined in the evaluation step.

The method may comprise the further step of reduction of the emission power after the setting of the main lobe direction of the antenna.

The object can also be achieved by an apparatus for alignment of an antenna with an adjustable directional characteristic in a mobile station in a mobile radio system, comprising a measurement device for determination of a first variable which is characteristic of the signal strength, and a second variable which is characteristic of the signal quality, for different alignments of the main lobe direction of the antenna, an evaluation unit for evaluation of the first and second variables determined in the measurement device, and a control device for setting the main lobe direction of the antenna as a function of an evaluation result determined by the evaluation unit.

The second variable can be the bit error rate. The apparatus may furthermore comprise a unit for determination of the geographical alignment of the mobile station, in particular a compass, and a direction evaluation unit which evaluates position information for the mobile station, position information for a fixed station and the geographical alignment of the mobile station in order to determine the direction in which the fixed station is arranged with respect to the mobile station. The output side of the direction evaluation unit can be connected to the control device. The apparatus may also comprise a GPS receiver for determination of the position information for the mobile station. The apparatus may further comprise in particular an acoustic signal transmitter for emission of a direction changing signal for the user, with the input side of the apparatus being connected to the direction evaluation unit. The evaluation unit can be integrated in a baseband chip in the mobile station.

The object can furthermore be achieved by an apparatus for alignment of an antenna with an adjustable directional characteristic in a mobile station in a mobile radio system, comprising a unit for determination of the geographical alignment of the mobile station, in particular a compass, a direction evaluation unit which evaluates position information for the mobile station, position information for a fixed station and the geographical alignment of the mobile station, and a control device for setting the main lobe direction of the antenna as a function of an evaluation result determined in the direction evaluation unit.

The method according to the invention is accordingly based on an antenna with a directional characteristic in a mobile station in a mobile radio system, which can be adjusted as a function of the direction, in particular in the horizontal direction. According to a first aspect of the invention, different variables are determined in a first step for different alignments of the main lobe direction of the antenna: a first variable which is characteristic of the signal strength and a second variable which is characteristic of the signal quality. In a further step, a preferred alignment is determined by evaluation of the determined values of the above variables for different alignments of the antenna. The main lobe direction can then be set in a further step from the knowledge of the determined preferred alignment, such that this main lobe direction matches the preferred alignment. This alignment allows optimum reception and, in general, an optimum transmission response as well, with respect to the associated fixed station. This is based on the fact that the antenna directional characteristic for reception and transmission is in general the same, or is at least very similar. The emitted radiated power from the mobile station can thus always be set to the minimum required value, thus reducing the radiation load.

In this case, the chronological sequence of the individual steps in the method is variable. In particular, it is possible to carry out all of the measurements of both variables for all directions first of all, and only then to carry out the evaluation of the values. It would also be feasible to set the antenna with corresponding measurement and evaluation of one variable first of all, and then, in a subsequent step, to set the antenna more accurately with the aid of the measurement and evaluation of the values of the second variable, for different alignments of the main lobe direction. Alternatively, an iterative procedure would also be feasible, first of all with a rough estimate of the preferred direction based on the two variables, and then with estimates of this direction becoming ever finer.

With regard to the first variable mentioned in the method, which is characteristic of the signal strength, the following may be considered, inter alia: a variable which describes the field characteristic of the electromagnetic field, in particular the electrical or magnetic field strength as well as links between them, that is to say including energy levels, as well as corresponding field densities or energy densities. The second variable (signal quality) that is determined in the method relates to a variable which, in contrast to amplitude information in the first variable, reflects the quality of the detected signal, in terms of its original information contents. The bit error rate or the frame error rate may be mentioned as suitable variables for this purpose.

The advantage of this method is that the directional antenna can be optimally set to the variable (signal quality) which in the end is critical for the telecommunication connection, by taking account of the information from the second variable. In contrast to methods which are based only on the evaluation of the signal strength, this method is robust with respect to interference. In general, it is not possible to deduce that the signal quality is high because the signal strength is high. For example, despite a high signal strength, the signal may be interfered with or distorted inter alia by signals from adjacent channels, by reflections and by multipath propagation associated with them, or by strong interference signals, while these problems do not occur with a differently set receiving device with a lower signal strength. The influence of interference signals and signal distortion on the determination of the optimum alignment can be considerably reduced by taking account of the second variable, according to the invention. This allows the radiation power to be optimally reduced for widely differing scenarios.

In addition to being suitable for use in digital mobile telephones, the method according to the invention is also suitable for other types of terminals, for example for notebooks or personal digital assistants (PDAs), as well as for other communication systems such as wireless local area network systems (WLAN).

According to a first preferred method variant, the second variable is the bit error rate. This is advantageous since this variable is typically governed in any case by the baseband processor in the mobile station, and it can therefore be used for the method according to the invention without any additional complexity.

According to a further preferred embodiment of the method according to the invention, the optimum main lobe direction can be determined by first of all assessing the alignments using the first variable. In a second step, the optimum alignment is then determined by maximizing the second variable from the set of possibly suitable alignments obtained in this way. This ensures that the alignment which is found corresponds to the antenna with optimum signal quality with a high signal strength.

Furthermore, in one preferred method variant, the following position and alignment information is determined: the position information for the mobile station, the position information for the fixed station and the geographical alignment of the mobile station. This additional information is then evaluated in a further step. The position information for the fixed station is in this case normally transmitted by the fixed station by radio to the mobile station. The position information for the mobile station can be determined by means of a satellite-based navigation system, in particular GPS (Global Positioning System). The expression the geographical alignment of the mobile station means the orientation of the mobile station with respect to the earth's surface, which is preferably determined using a compass.

The determination and evaluation of the position and alignment information can, on the one hand, be used to improve the precision, interference susceptibility and speed of the adjustment algorithm. On the other hand, the additional information can be used to further reduce the power emitted from the mobile station, particularly in the direction of the user. For this purpose, the position of the user, in particular his head, must be set between the mobile station and the fixed station in relation to the main lobe direction. If the fixed station is located on the side of the head facing away from the mobile station, that is to say, in the case of the method according to the invention, in a direction in which the antenna would necessarily have to transmit through the head, the attenuation resulting from the head means that it is not possible to set the transmission level to the minimum possible level without attenuation, on the one hand, while, on the other hand, the radiation load for the user is higher than if the fixed station were located on the side of the head facing the mobile station. By determination of the position and alignment information, it is possible to determine the direction to the fixed station with respect to the alignment of the telephone and thus—via the placing of the mobile station against the ear, in the normal known way—the alignment of the head, so that appropriate counter-measures can be taken.

According to a further preferred embodiment of the method, direction changing signals are emitted to the user of the mobile station as the result of the evaluation of the position and alignment information, or as the result of the evaluation of the first and second variables. These signals are preferably in an acoustic form, but may also, for example, be emitted visually via a display unit on the mobile appliance. The direction changing signals can now be used to request the user to turn, to align himself and/or to change his position until a virtually optimum direction and/or position is found with respect to the fixed station, with a correspondingly lower required transmission power—without the signal being attenuated by the user's body.

In general, direction changing signals can also be determined from the first variable or second variable on its own without any knowledge of the position and alignment information. It is thus also possible to determine the direction changing signals from the evaluation of the values of the first variable, of the second variable or of the position and alignment information on its own, and from any desired combination of these variables and information.

In a further preferred method variant, the evaluation result for the position and alignment information can be used in addition to the evaluation results for the first and second variables in order to set the main lobe direction, thus allowing the main lobe direction to be set more quickly, more precisely and more robustly with respect to interference signals.

According to one preferred embodiment of the method according to the invention, this adjustment process can be carried out in two steps. First of all, the main lobe direction is preset as a function of the evaluation result of the position and evaluation information and the main lobe direction is then set precisely by the evaluation of the first and second variables. Presetting the main lobe direction reduces the work involved in the adjustment process, which is based on the evaluation of the first and second variables, thus leading to a considerable improvement in the rate and accuracy of adjustment.

According to a second aspect of the invention, the adjustment of the main lobe direction of the antenna may also be based on the evaluation of the position and alignment information, without requiring any information relating to the first or second variable, as mentioned above. This is advantageous, inter alia, particularly when the position information can easily be called up via a GPS receiver which is in any case integrated in the mobile station. Furthermore, a method which is based only on the evaluation of the position and alignment information may possibly be sufficiently exact for mobile radio systems in which the radio interface is not subject to interference, or is subject to interference only to a minor extent from multipath propagation, shadowing, reflection or scatter.

According to one preferred method variant, the emitted power can be reduced following adjustment of the main lobe direction. The reduction in the emitted power is then restricted, for example, by a required maximum permissible bit error rate. This offers the advantage that a minimum emitted power value can be achieved after completion of the adjustment algorithm—matched to the adjustment result.

According to one preferred embodiment of the apparatus according to the invention, the evaluation unit which carries out the evaluation of the first and second variables may be integrated in the baseband chip in the mobile station.

BRIEF DESCRIPTION OF THE DRAWINGS

The invention will be explained in more detail in the following text using two exemplary embodiments and with reference to the drawings, in which.

PREFERRED EMBODIMENTS

Figure 1:
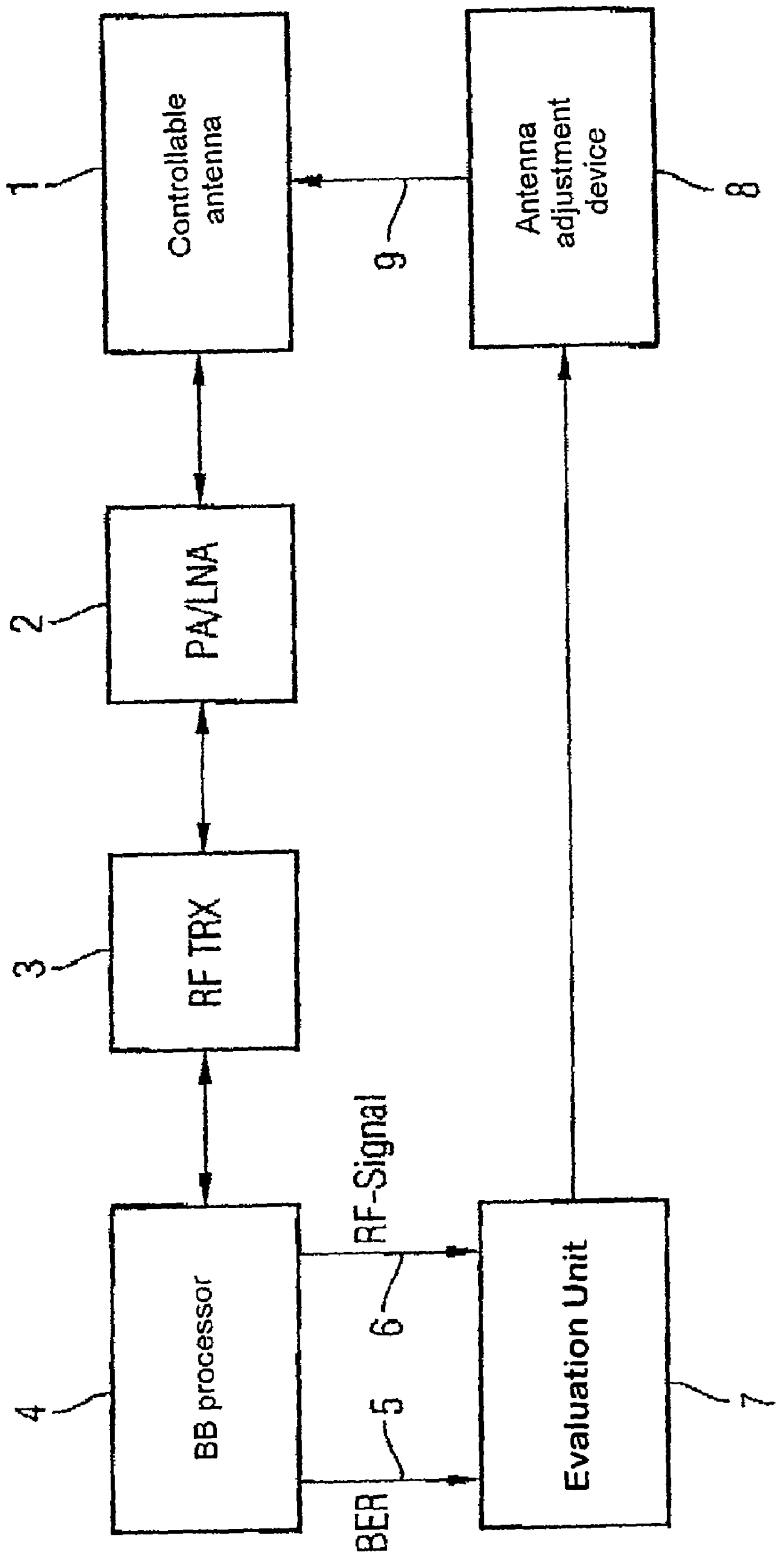
FIG. 1 shows the block diagram of a first exemplary embodiment according to the invention.

According to the block diagram illustrated in FIG. 1, an apparatus according to the invention and based on the first exemplary embodiment is designed as follows: An antenna 1 whose directional characteristic is controllable is electrically connected bidirectionally to an amplifier block 2. The amplifier block 2 is itself bidirectionally connected to a radio-frequency transmitter/receiver circuit 3, also referred to as an RF transceiver (RF-TRX). The RF transceiver 3 is also bidirectionally connected to a baseband processor 4 (BB processor). The output variables from this baseband processor 4 are the bit error rate 5 (BER) and the field strength 6 (RF signal) of the received signal, and these variables are supplied as input variables to an evaluation unit 7. The output of the evaluation unit 7 is connected to an antenna adjustment device 8, which in turn supplies a control signal 9 to the control input of the controllable antenna 1.

The antenna 1 with an adjustable directional characteristic is a single antenna element, whose directional characteristic, when using a so-called inverted-F antenna, is set by means of different impedance circuitry, or is an antenna array which has at least two individual antenna elements, whose amplitudes and/or phases are varied in order to adjust the directional characteristic. The output signal from the adjustable antenna 1 is amplified with the aid of an extremely sensitive and low-noise preamplifier (low noise amplifier—LNA), which is located in the amplifier block 2, in terms of its signal range, to a value that is necessary for further processing. Conversely, for transmission, the transmission power is set to the required value by a power amplifier (PA) which is located in the amplifier block 2. In the receiving mode, after adaptation of the signal range in the RF transceiver 3, the amplified received signal is demodulated, during which process the information component in the signal is mixed to baseband. The adjacent baseband processor 4 for further processing of this baseband information produces, on its output side by processing of its input signal, two signals as a measure of the bit error rate 5 and of the field strength 6. Since it is necessary to evaluate the bit error rate and the field strength of the signal coming from the fixed station for power adjustment, these variables are available as standard in the baseband processor 4. The evaluation unit 7 evaluates these variables using a suitable algorithm. The algorithm is used to vary the radiation direction of the controllable antenna until an optimality criterion is satisfied, which is based on the bit error rate 5 and the field strength 6 as influencing variables. The evaluation taking into account the bit error rate 5 and the field strength 6 can in this case be carried out in various ways: for example, it is possible to provide for both variables to be evaluated separately, for an initial selection to be made for the antenna setting on the basis of the field strength and/or signal power, and for fine adjustment then to be carried out by optimization of the bit error rate. It is also possible to form a combination variable from the bit error rate and the field strength, and to determine the main lobe direction by searching for the maximum of this combination variable. The algorithm must be designed such that the consideration of the bit error rate (or of some other variable which is characteristic of the signal quality) allows interference caused by strong signal interference sources to be identified as such, and makes it possible to avoid sub-optimum alignment of this antenna in this way. The method as such can be carried out by calling up the values of the bit error rate 5 and of the field strength 6 for all of the directions which can be adjusted and by subsequently selecting the optimum direction on the basis of these values. However, it is also possible to use iterative adjustment methods or adjustment methods in the adjustment algorithm, with the antenna being set separately firstly on the basis of the bit error rate 5 and then on the basis of the field strength 6, or vice versa.

As illustrated in this exemplary embodiment, it is generally sufficient to determine the main reception direction, that is to say the direction with the maximum transmission quality for reception, via the reception path for the reception channel, since, in most cases, this also matches the main transmission direction, which is defined in an analogous manner, to the fixed station. This is based on the fact that the antenna directional characteristic is in general the same or at least very similar for reception and transmission. The alignment of the antenna may either be permanently updated using the so-called standby receiving mode, that is to say without the existence of a call connection, or else it may be carried out only when a call is set up, so that the antenna is always optimally set when the call mode starts. Alternatively, the alignment of the antenna may also be adjusted during the call connection. This procedure ensures that the antenna is always optimally set even during the call.

As explained above, in the first exemplary embodiment, the main lobe direction of the antenna is set such that, in terms of the signal quality, optimum reception is possible and conversely such that the transmission power of the mobile station during transmission can be optimized on the basis that the reception and transmission characteristics are the same. For example, as a guideline value, the transmission power should be selected such that the power density in the direction of the main lobe direction is equal to the power density without the use of a directional antenna. The total emitted power which results from this when using the directional antenna is less than that of an antenna which cannot be controlled approximately by the reciprocal factor of the antenna gain, which is defined as the ratio of the maximum power density Soma in the radial direction to the corresponding power density of an isotropic spherical antenna element Sri. This, on the one hand, increases the maximum operating duration of the mobile station and, furthermore, on average reduces the power absorbed by the user approximately by the same factor as the power reduction described above. In this context, it should be pointed out that the antenna gain of the directional antennas which are used in the method according to the invention is in general, in a practical implementation, not comparable with corresponding directional antennas in fixed stations in digital cellular mobile radio systems which normally use narrow beams and have typical gains of more than 10 dB. The mobile station antennas used in the method according to the invention allow an antenna gain of 3 to 6 dB with very simple embodiments, associated with a reduction in the transmission power by a factor of one half to one quarter.

In order to ensure that the main lobe direction of the antenna does not pass through the head of the user, it is also possible to design the antenna such that the main lobe direction can be adjusted only within the half plane which corresponds to the side of the mobile telephone facing away from the head.

Figure 2:
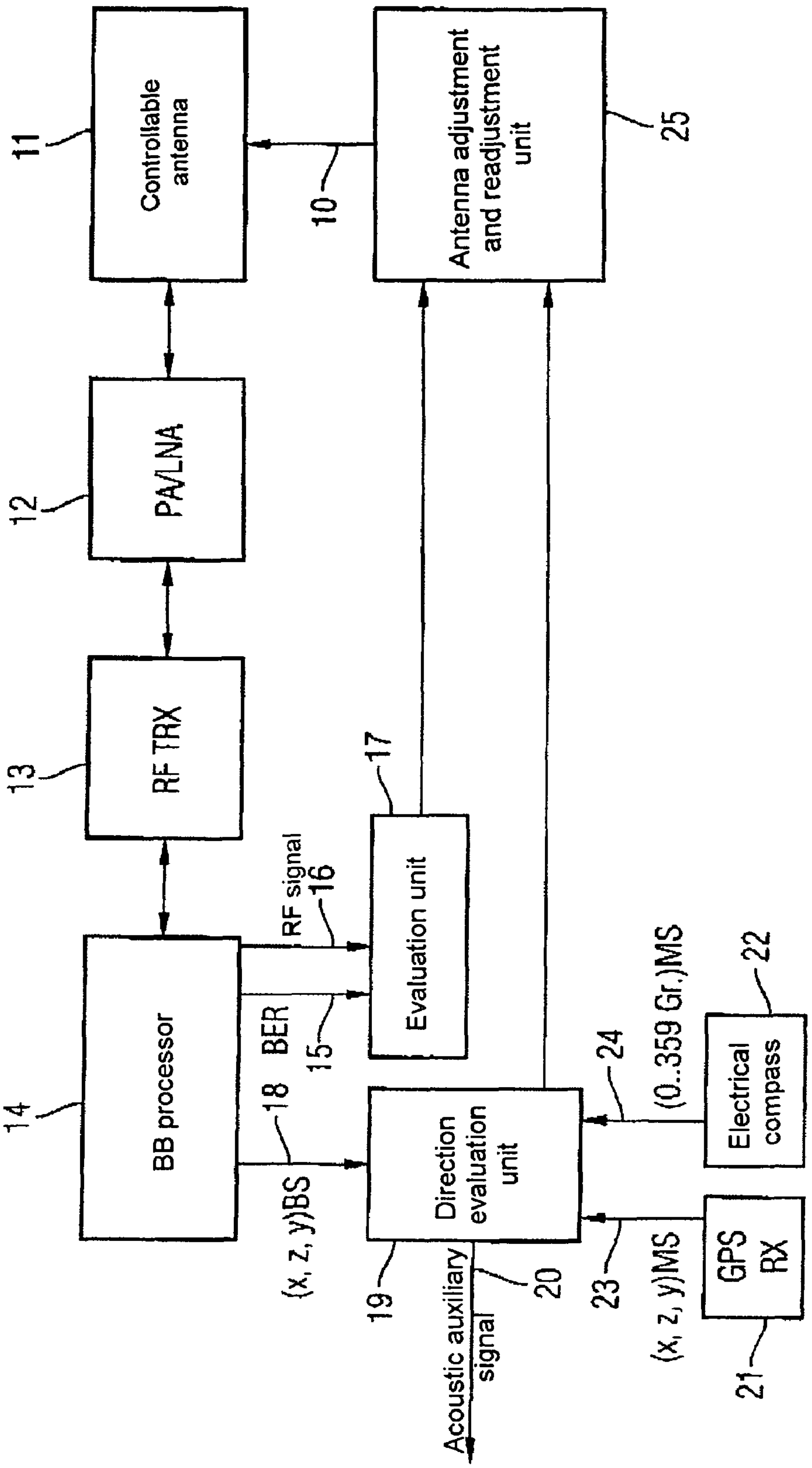
FIG. 2 shows the block diagram of a second exemplary embodiment according to the invention.

FIG. 2 shows the structure of the second exemplary embodiment according to the invention. An antenna 11 whose directional characteristic is controllable is electrically connected bidirectionally to an amplifier block 12. The amplifier block 12 is in turn bidirectionally connected to a radio-frequency transmitter/receiver circuit 13, also referred to as an RF transceiver (RF-TRX). The RF transceiver 13 is also bidirectionally connected to a baseband processor 14 (BB processor), whose output variables are the bit error rate 15 (BER), the field strength 16 (RF signal) of the received signal and position information for the fixed station ((x,z,y)BS) 18. The bit error rate 15 and the field strength information 16 form the input variables for a first evaluation unit 17, whose output is connected to an antenna adjustment and readjustment unit 25, which in turn supplies a control signal 10 to the control input of the controllable antenna 1. The position information for the fixed station 18 in conjunction with the position information for the mobile station ((x,z,y)MS) 23 and the geographical alignment of the mobile station ((0 . . . 359°) MS) 24 as further variables form the input variables for a direction evaluation unit 19. The position information for the mobile station 23 is produced as the output variable of a receiving unit (GPS RX) 21 for the satellite-based Global Positioning System (GPS) navigation system. The geographical alignment 24 is also produced as the output variable from an electronic compass 22. The direction evaluation unit 19 produces an acoustic auxiliary signal 20 and, furthermore, drives the antenna adjustment and readjustment unit 25 in parallel with the first evaluation unit 17.

The controllable antenna 11, the amplifier block 12, the RF transceiver 13 and the baseband processor 14 correspond in terms of their design and their functionality to the corresponding blocks 1, 2, 3, 4 in the first exemplary embodiment. The evaluation unit 17 makes it possible to adjust the main lobe direction of the antenna 11 via the antenna adjustment and readjustment unit 25 such that, in terms of the signal quality, optimum reception, and, during transmission, optimization of the transmission power of the mobile station are possible. The advantages which result from this have already been explained in the description of the first exemplary embodiment.

In addition, the second exemplary embodiment makes use of position and direction information which makes it possible to further reduce the absorbed radiation power in the user in comparison to the first exemplary embodiment and, in addition, also to reduce the total power by preventing radiation attenuation via the user's body. The position information 18 (x,z,y)BS for the fixed station is obtained on the basis of evaluation of the digital signal information in the signal received in the mobile station, and is part of the received data symbols. This is thus provided by the baseband processor 14. A direction vector between the mobile station and the fixed station is determined in the direction evaluation unit, together with the position of the mobile station (x,z,y)MS, as calculated using GPS. The exact direction of the side of the telephone facing away from the head can be derived from the geographical alignment information for the mobile telephone (0 . . . 359°)MS 24. These two information items are related to one another in the direction evaluation unit 19. In this case, in order to determine the optimum alignment, it is also possible to use evaluated position and direction information from before the present time, also referred to as history. If the alignment of the user with respect to the fixed station is poor, particularly when the imaginary connecting line between the mobile station and the fixed station passes through the body or the head of the user, an acoustic auxiliary signal 20 is emitted at the output of the direction evaluation unit 19, in order to protect the user. This requests the user—in a similar way to electronic parking aids in a vehicle—to change his direction until an optimum alignment with respect to the fixed station is achieved. Either the tone frequency or the tone sequence of the acoustic auxiliary signal can be modulated as an orientation aid for this purpose.

Furthermore, the main lobe direction of the antenna can also be preset with the aid of the position information 18 and 23, possibly in conjunction with the alignment of the mobile station 24. For this reason, in the second exemplary embodiment, the antenna adjustment and readjustment unit 25 is also controlled via the direction evaluation unit 19. The main lobe direction is preset solely on the basis of the signal emitted from the direction evaluation unit 19, that is to say on the basis of the geographical information. Once the presetting process has been carried out, the fine adjustment of the antenna 11 is carried out solely on the basis of the information emitted from the evaluation unit 17, that is to say according to the first exemplary embodiment. This offers the advantage that it reduces the load on the final adjustment algorithm, which is based on the bit error rate 15 and the field strength 16, thus leading to a considerable improvement in the rate of adjustment and in the adjustment accuracy.

We claim:

1. A method for alignment of an antenna with an adjustable directional characteristic in a mobile station in a mobile radio system, comprising:

a) determining a first variable which is characteristic of the signal strength, a second variable which is characteristic of the signal quality, and a third variable which is characteristic of the geographical alignment of the mobile station, for different alignments of the main lobe direction of the antenna;

b) deriving the direction of a side of the mobile station facing away from a user's head from the geographical alignment information;

c) evaluating the first, second and third variables as determined in step a) and the direction derived in step b) for different alignments of the main lobe direction of the antenna;

d) setting of the main lobe direction of the antenna as a function of an evaluation result determined in step c);

e) determining the position information for the mobile station and the position information for a fixed station:

f) evaluating the position information determined in step e) and the geographical alignment of the mobile station: and g) emitting a particular acoustic direction changing signal for the user as a function of the evaluation result determined in step f), or as a function of the derivation result determined in step b).

2. The method according to claim 1, wherein the second variable is the bit error rate.

3. The method according to claim 1, wherein the main lobe direction of the antenna is determined by maximizing the second variable for alignments which have been determined by assessment of the first variable.

4. The method according to claim 1, wherein the evaluation result obtained in step f) is taken into account in the setting of the main lobe direction in step d).

5. The method according to claim 1, further comprising:

presetting a provisional main lobe direction of the antenna on the basis of the evaluation result determined in step f), and then setting of the main lobe direction on the basis of the evaluation result obtained in steps a), b) and c).

6. The method according to claim 1, wherein the method is carried out in the standby receiving mode of the mobile station or while a connection is set up between the mobile station and the fixed station.

7. The method according to claim 1, further comprising:

reducing the emission power after the setting of the main lobe direction of the antenna.

8. A method for alignment of an antenna with an adjustable directional characteristic in a mobile station in a mobile radio system, comprising:

determining the following position and alignment information:

the position information for the mobile station, the position information for a fixed station, the geographical alignment of the mobile station;

deriving the direction of a side of the mobile station facing away from a user—s head from the geographical alignment information;

evaluating the position, alignment and direction information determined in the preceding steps;

setting of the main lobe direction of the antenna as a function of the evaluation result determined in the evaluation step and emitting a particular acoustic direction changing signal for the user as a function of the evaluation result, or as a function of the derivation result.

9. The method according to claim 8, comprising the following further step:

reduction of the emission power after the setting of the main lobe direction of the antenna.

10. An apparatus for alignment of an antenna with an adjustable directional characteristic in a mobile station in a mobile radio system, comprising:

a measurement device configured to determine a first variable which is characteristic of the signal strength, a second variable which is characteristic of the signal quality, and a third variable which is characteristic of the geographical alignment of the mobile station, for different alignments of the main lobe direction of the antenna, a calculation unit configured to calculate the direction of a side of the mobile station facing away from a user—s head from the geographical alignment information;

an evaluation unit configured to firstly evaluate the first, second and third variables determined in the measurement device and the direction calculated in the calculation unit;

a control device configured to set the main lobe direction of the antenna as a function of an evaluation result determined by the evaluation unit;

the evaluation unit further configured to secondly evaluate position information for the mobile station, position information for a fixed station and the geographical alignment of the mobile station in order to determine the direction in which the fixed station is arranged with respect to the mobile station; and an acoustic signal transmitter configured to emit a direction changing signal for the user as a function of the first or the second evaluation of the evaluation unit.

11. The apparatus according to claim 10, wherein the second variable is the bit error rate.

12. The apparatus according to claim 10, wherein the output side of the direction evaluation unit is connected to the control device.

13. The apparatus according to claim 12 further comprising a GPS receiver configured to determine the position information for the mobile station.

14. The apparatus according to claim 10, wherein the evaluation unit is integrated in a baseband chip in the mobile station.

15. An apparatus for alignment of an antenna with an adjustable directional characteristic in a mobile station in a mobile radio system, comprising:

a unit configured to determine the geographical alignment of the mobile station;

a unit configured to derive the direction of a side of the mobile station facing away from a user—s head from the geographical alignment information;

a direction evaluation unit configured to evaluate position information for the mobile station, position information for a fixed station, the geographical alignment of the mobile station and the derived direction information;

a control device configured to set the main lobe direction of the antenna as a function of an evaluation result determined in the direction evaluation unit; and an acoustic signal transmitter configured to emit a direction changing signal for the user as a function of the evaluation result determined un the direction evaluation unit.

* * * * *